(12) United States Patent
Park et al.

(10) Patent No.: US 11,623,660 B2
(45) Date of Patent: Apr. 11, 2023

(54) METHOD, APPARATUS, AND COMPUTER PROGRAM FOR AVOIDING COLLISION OF AUTONOMOUS VEHICLE

(71) Applicant: RideFlux Inc., Jeju-si (KR)

(72) Inventors: Jung Hee Park, Jeju-si (KR); Ho Yun, Jeju-si (KR); Hyun Jung Cho, Jeju-si (KR); Sung Pil Yang, Jeju-si (KR); Ha Wook Jeong, Jeju-si (KR)

(73) Assignee: RideFlux Inc., Jeju-si ( * ) Notice: Subject to any disclaimer, the term of this patent is extended or adjusted under 35 U.S.C. 154(b) by 162 days.

(21) Appl. No.: 17/028,393

(22) Filed: Sep. 22, 2020

(65) Prior Publication Data

US 2021/0171063 A1 Jun. 10, 2021

(30) Foreign Application Priority Data

Dec. 10, 2019 (KR) .................. 10-2019-0163779

(51) Int. Cl.
*B60W 30/09* (2012.01)
*B60W 60/00* (2020.01)
*G01C 21/34* (2006.01)
*B60W 30/095* (2012.01)

(52) U.S. Cl.
CPC ........ *B60W 60/0015* (2020.02); *B60W 30/09* (2013.01); *B60W 30/0956* (2013.01); *G01C 21/3453* (2013.01)

(58) Field of Classification Search
CPC ............ B60W 60/0015; B60W 30/09; B60W 30/0956; B60W 30/08; B60W 30/0953; G01C 21/3453; B60R 21/013; G05D 1/0214; B60Y 2300/08; B60Y 2400/3042
See application file for complete search history.

(56) References Cited

U.S. PATENT DOCUMENTS

| | | | |
|---|---|---|---|
| 11,287,814 B2* | 3/2022 | Gross | G05D 1/0255 |
| 2017/0101056 A1* | 4/2017 | Park | G08G 1/04 |
| 2018/0174462 A1* | 6/2018 | Um | B60W 30/09 |
| 2018/0370529 A1* | 12/2018 | Matsunaga | B60W 50/14 |
| 2019/0160675 A1* | 5/2019 | Paschall, II | G05D 1/0214 |
| 2019/0243371 A1* | 8/2019 | Nister | G05D 1/0242 |
| 2019/0276013 A1* | 9/2019 | Kim | B60W 30/0956 |
| 2020/0023837 A1* | 1/2020 | Yokoi | B60W 30/0953 |

(Continued)

FOREIGN PATENT DOCUMENTS

| | | |
|---|---|---|
| KR | 10-1512935 B1 | 4/2015 |
| KR | 10-2017-0041417 A | 4/2017 |
| KR | 10-2019-0106339 A | 9/2019 |

*Primary Examiner* — Ryan Rink
(74) *Attorney, Agent, or Firm* — Sughrue Mion, PLLC

(57) ABSTRACT

There is provided a method for avoiding the collision of an autonomous vehicle, the method including: setting collision detection areas including first and second collision detection areas based on a state of a first vehicle and a collision detection target at a location adjacent to the first vehicle; and determining the possibility of a collision between the first vehicle and the collision detection target using the collision detection areas of the first vehicle and the collision detection target; wherein setting the collision detection areas includes maintaining an attribute of the first collision detection area and changing an attribute of the second collision detection area in response to a change in the state of the first vehicle and the collision detection target.

12 Claims, 11 Drawing Sheets

(56) References Cited

U.S. PATENT DOCUMENTS

| | | | | |
|---|---|---|---|---|
| 2020/0097739 A1* | 3/2020 | Hashimoto | ....... | B60W 30/0956 |
| 2020/0339116 A1* | 10/2020 | Xu | .................. | B60W 30/18159 |
| 2021/0046923 A1* | 2/2021 | Olson | .................. | G05D 1/0214 |

* cited by examiner

METHOD, APPARATUS, AND COMPUTER PROGRAM FOR AVOIDING COLLISION OF AUTONOMOUS VEHICLE

CROSS-REFERENCE TO RELATED APPLICATION

This application claims the benefit of Korean Patent Application No. 10-2019-0163779 filed on Dec. 10, 2019, which is hereby incorporated by reference herein in its entirety.

BACKGROUND

1. Technical Field

Various embodiments of the present invention relate to a method, apparatus, and computer program for avoiding the collision of an autonomous vehicle.

2. Description of the Related Art

There is a trend in which for the convenience of users driving vehicles, various types of sensors and electronic devices (e.g., an advanced driver assistance system (ADAS)) are being installed. In particular, there has been actively conducted the development of technology for an autonomous driving system for a vehicle that recognizes a surrounding environment without a driver's intervention and autonomously travels to a given destination according to the recognized surrounding environment.

Meanwhile, since the autonomous driving system itself performs determination without a driver's intervention and autonomously drives a vehicle, there is a high possibility that a collision accident is likely to occur between an autonomous vehicle and an adjacent object (e.g., a vehicle, a person, or another structure).

In order to overcome this problem, conventionally, there has been used a method of continuously detecting an area within a predetermined range from a vehicle and, when a specific object approaches the area within the predetermined range, determining a high possibility of collision and generating an avoidance path.

However, the conventional method for determining the possibility of a collision designates and detects only a predetermined range by taking into account the size of a vehicle without taking into account the current state of the vehicle (for example, the path of the vehicle, the speed of the vehicle, and/or the like). Accordingly, the conventional method for determining the possibility of a collision has difficulty in dealing with a sudden collision accident (e.g., a collision accident that occurs while a vehicle is traveling at high speed, or a collision accident that occurs when an adjacent object approaches at high speed).

Furthermore, when a wide range is detected in order to prevent a sudden collision accident, a heavy computational load is required to determine the possibility of a collision, and thus it is difficult to rapidly determine and deal with the possibility of a collision.

PRIOR ART DOCUMENT

Patent Document

Korean Patent No. 10-1304625 (published on Aug. 30, 2013)

SUMMARY

An object of the present invention is to provide a method, apparatus, and computer program for avoiding the collision of an autonomous vehicle, which can determine the possibility of a collision by taking into account whether collision detection areas set for a vehicle and a collision detection target overlap each other, in which case an attribute of the collision detection areas is changed according to the state of the vehicle and the collision detection target, thereby enabling the possibility of a collision to be more accurately determined.

The objects that are achieved by the present invention are not limited to the above-described object, and other objects that have not been described above will be clearly understood by those skilled in the art from the following description.

According to an aspect of the present invention, there is provided a method for avoiding the collision of an autonomous vehicle, the method being performed by a computing apparatus, the method including: setting collision detection areas including first and second collision detection areas based on a state of a first vehicle and a collision detection target at a location adjacent to the first vehicle; and determining the possibility of a collision between the first vehicle and the collision detection target using the collision detection areas of the first vehicle and the collision detection target; wherein setting the collision detection areas includes maintaining an attribute of the first collision detection area and changing an attribute of the second collision detection area in response to a change in the state of the first vehicle and the collision detection target.

According to another aspect of the present invention, there is provided an apparatus including: memory configured to store one or more instructions; and a processor configured to execute the one or more instructions stored in the memory; wherein the processor executes the one or more instructions, thereby performing a method for avoiding the collision of an autonomous vehicle, the method including: setting collision detection areas including first and second collision detection areas based on a state of a first vehicle and a collision detection target at a location adjacent to the first vehicle; and determining the possibility of a collision between the first vehicle and the collision detection target using the collision detection areas of the first vehicle and the collision detection target; wherein setting the collision detection areas includes maintaining an attribute of the first collision detection area and changing an attribute of the second collision detection area in response to a change in the state of the first vehicle and the collision detection target.

According to still another aspect of the present invention, there is provided a computer program for avoiding the collision of an autonomous vehicle, the computer program being stored in a computer-readable storage medium to perform, in combination with a computer, which is hardware, a method for avoiding the collision of an autonomous vehicle, the method including: setting collision detection areas including first and second collision detection areas based on a state of a first vehicle and a collision detection target at a location adjacent to the first vehicle; and determining the possibility of a collision between the first vehicle and the collision detection target using the collision detection areas of the first vehicle and the collision detection target; wherein setting the collision detection areas includes maintaining an attribute of the first collision detection area and changing an attribute of the second collision detection area in response to a change in the state of the first vehicle and the collision detection target.

Other specific details of the present invention are included in the following detailed description and the accompanying drawings.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
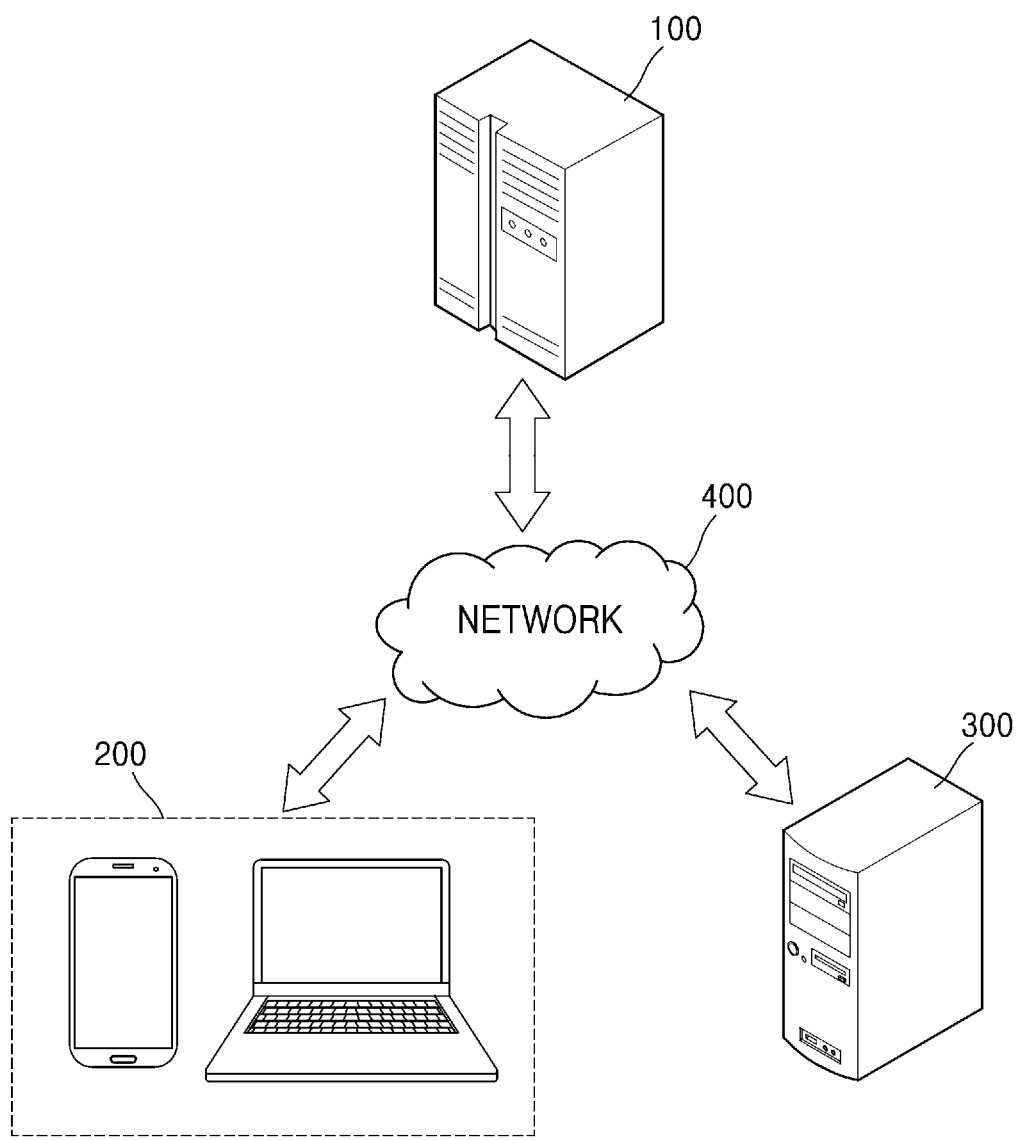
FIG. 1 is a diagram showing the configuration of a system for avoiding the collision of an autonomous vehicle according to an embodiment of the present invention.

The advantages and features of the present invention, and methods for achieving them will become apparent by referring to embodiments that will be described in detail below in conjunction with the accompanying drawings. However, the present invention is not limited to the embodiments disclosed below, but may be implemented in various different forms. The present embodiments are provided merely to make the disclosure of the present invention complete and to fully convey the scope of the present invention to those having ordinary skill in the art to which the present invention pertains. The present invention is defined only by the scope of the claims.

The terms used herein are intended to describe the embodiments but are not intended to limit the present invention. In the present specification and the attached claims, a singular form also includes a plural form unless otherwise specified in a corresponding passage. As used herein, "include (comprise)" and/or "including (comprising)" do not exclude the presence or addition of one or more components other than the components mentioned. Throughout the specification, the same reference numerals designate the same components, and the term "and/or" includes each of the components mentioned and every combination of one or more of the components mentioned. Although the terms "first," "second," etc. are used to describe various components, it will be apparent that these components are not limited by these terms. These terms are only used to distinguish one component from other components. Accordingly, it will be apparent that a first component mentioned below may be a second component within the technical spirit of the present invention.

Unless otherwise defined, each of all the terms (including technical and scientific terms) used herein may be used in a sense that can be commonly understood by those having ordinary skill in the art to which the present invention pertains. Furthermore, the terms defined in the commonly used dictionaries are not ideally or excessively interpreted unless explicitly defined.

The term "unit" or "module" used herein means a software component, or a hardware component such as a field programmable gate array (FPGA) or an application specific integrated circuit (ASIC), that performs a specific task. A unit or module may advantageously be configured to reside in an addressable storage medium and configured to execute on one or more processors. Accordingly, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functions provided in the components, units, or modules may be combined into a smaller number of components, units, or modules, or may be further separated into additional components, units, or modules.

Spatially relative terms, such as "below," "beneath," "lower," "above," "upper," and the like, may be used herein for ease of description to describe the relationship of one component or feature to another component(s) or feature(s) as shown in the drawings. It will be understood that the spatially relative terms are intended to encompass different orientations of a component in use or operation in addition to the orientation depicted in the drawings. For example, when a component shown in the drawings is turned over, components described as being "below" or "beneath" other components or features would then be oriented "above" the other components or features. Accordingly, the exemplary term "below" or "beneath" may encompass both an orientation of above, and below or beneath. A component may be otherwise oriented, in which case the spatially relative terms used herein may be interpreted accordingly.

In the present specification and the attached claims, the computer refers to all types of hardware devices including at least one processor. In one embodiment, the computer may be understood as having a meaning encompassing a software configuration operating in a corresponding hardware device.

For example, the computer may be understood as having a meaning including, but not limited to, a smartphone, a tablet PC, a desktop, a laptop, and a user client and applications running on each of the devices.

Embodiments of the present invention will be described in detail below with reference to the accompanying drawings.

Although each step described herein is described as being performed by a computer, the agent of each step is not limited thereto. In an embodiment, at least some of individual steps may be performed in different devices.

Referring to FIG. 1, a system for avoiding the collision of an autonomous vehicle according to an embodiment of the present invention may include an apparatus 100 for avoiding the collision of an autonomous vehicle, a user terminal 200, and an external server 300.

In this case, the system for avoiding the collision of an autonomous vehicle, which is shown in FIG. 1, is provided according to one embodiment. The components of the system for avoiding the collision of an autonomous vehicle are not limited to those of the embodiment shown in FIG. 1. As needed, new components may be added, or the former components may be changed or deleted.

In one embodiment, the apparatus 100 for avoiding the collision of an autonomous vehicle may set collision detection areas including first and second collision detection areas (e.g., FIGS. 4A and 4B) based on a state of a first vehicle (e.g., 10 of FIGS. 4A to 11) and a collision detection target (e.g., 30 of FIG. 9) located adjacent to the first vehicle. In this case, the collision detection target may include a second vehicle traveling at a location adjacent to the first vehicle, a traffic line, a traffic lane, a guardrail, a person, a parked or stopped vehicle, and a fixed obstacle such as a construction site. However, the collision detection target is not limited thereto, but any object adjacent to the moving first vehicle may be applied as the collision detection target.

In various embodiments, the apparatus 100 for avoiding the collision of an autonomous vehicle may set the first and second collision detection areas each having a predetermined size based on the sizes of the first vehicle and the collision detection target, in which case an attribute (e.g., the number or size of or interval between detection areas) of the first collision detection area may be maintained and an attribute of the second collision detection area may be changed by taking into account the state, such as the path or speed, of the first vehicle and the collision detection target.

In one embodiment, the apparatus 100 for avoiding the collision of an autonomous vehicle may determine the possibility of a collision between the first vehicle and the collision detection target based on a form in which the collision detection area of the first vehicle and the collision detection area of the collision detection target overlap each other. For example, the apparatus 100 for avoiding the collision of an autonomous vehicle may determine that a state in question is any one of a collision state, a collision risk state, a collision caution state, and a safe state based on a form in which the collision detection area of the first vehicle and the collision detection area of the collision detection target overlap each other, the size of a range within which the collision detection area of the first vehicle and the collision detection area of the collision detection target overlap each other, or the distance between collision areas. However, the present invention is not limited thereto.

In one embodiment, the apparatus 100 for avoiding the collision of an autonomous vehicle may set an avoidance path for the first vehicle based on the possibility of a collision between the first vehicle and the collision detection target. In this case, providing an avoidance path means providing a new path or changing a state of the first vehicle (e.g., reducing speed or stopping) so that the first vehicle can avoid a collision. For example, when the possibility of a collision between the first vehicle and the collision detection target corresponds to at least one of a collision risk state and a collision caution state, the apparatus 100 for avoiding the collision of an autonomous vehicle may set an avoidance path for the first vehicle.

In one embodiment, the user terminal 200 may include a display in at least a portion of the user terminal 200, and may output a user interface (UI) (e.g., a vehicle collision state monitoring UI, or a travel path and avoidance path provision UI), provided from the apparatus 100 for avoiding the collision of an autonomous vehicle, via the display. For example, the user terminal 200 may include at least one of a smartphone, a tablet personal computer (PC), a notebook, a desktop, and a vehicular infotainment system, but is not limited thereto.

In various embodiments, the user terminal 200 may be connected to the apparatus 100 for avoiding the collision of an autonomous vehicle over a wired/wireless connection, and may output various types of information (e.g., information about the possibility of collision with a collision detection target) obtained from the apparatus 100 for avoiding the collision of an autonomous vehicle over a network 400. For example, a user may be connected to the apparatus 100 for avoiding the collision of an autonomous vehicle over a wireless connection, and may output a UI, including information provided from the apparatus 100 for avoiding the collision of an autonomous vehicle, to the display device of the vehicular infotainment system by using the communication module of the vehicular infotainment system provided in the user's own vehicle. However, the present invention is not limited thereto.

In one embodiment, the external server 300 may receive various sensor data detected from a plurality of sensors included in the first vehicle and various types of data generated from the apparatus 100 for avoiding the collision of an autonomous vehicle over the network 400, and may store the data. For example, the external server 300 may store laser scan sensor data and Light Detection and Ranging (LiDAR) scan sensor data detected from the plurality of sensor included in the first vehicle, and may store data on the possibility of a collision between the first vehicle and the collision detection target and data on an avoidance path generated from the apparatus 100 for avoiding the collision of an autonomous vehicle. However, the present invention is not limited thereto.

Figure 2:
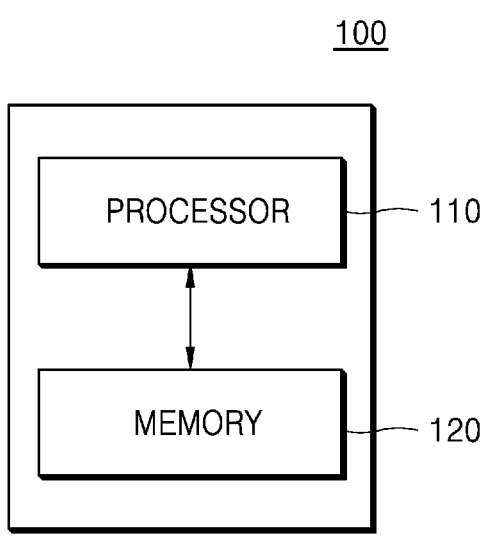
FIG. 2 is a diagram showing the hardware configuration of an apparatus for avoiding the collision of an autonomous vehicle according to another embodiment of the present invention.

FIG. 2 is a diagram showing the hardware configuration of an apparatus 100 for avoiding the collision of an autonomous vehicle according to another embodiment of the present invention.

Referring to FIG. 2, the apparatus 100 for avoiding the collision of an autonomous vehicle (hereinafter referred to as the "computing apparatus 100") according to the present embodiment may include a processor 110 and memory 120. In various embodiments, the computing apparatus 100 may further include a network interface (or a communication interface) (not shown), storage (not shown), and a bus (not shown).

In one embodiment, the processor 110 may control the overall operation of each component of the computing apparatus 100. The processor 110 may include a central processing unit (CPU), a micro-processor unit (MPU), a micro-controller unit (MCU), and any type of processor well known in the art to which the present invention pertains.

In various embodiments, the processor 110 may perform operations for at least one application or program for the performance of methods according to embodiments of the present invention. In various embodiments, the processor 110 may include one or more cores (not shown), and a graphic processing unit (not shown), and/or a connection path (e.g., a bus or the like) configured to transmit and receive signals to and from another component.

In various embodiments, the processor 110 may further include random access memory (RAM) (not shown) and read-only memory (ROM) (not shown) configured to temporarily and/or permanently store signals (or data) processed inside the processor 110. Furthermore, the processor 110 may be implemented in the form of a system on chip (SoC) including a graphics processing unit and at least one of RAM and ROM.

In one embodiment, the processor 110 may execute one or more instructions stored in the memory 120, thereby performing a method (a method for avoiding the collision of an autonomous vehicle) to be described in conjunction with FIGS. 3 to 10. For example, the processor 110 may execute one or more instructions stored in the memory 120, thereby performing a method for avoiding the collision of an autonomous vehicle, the method including: setting collision detection areas including first and second collision detection areas based on a state of a first vehicle and a collision detection target at a location adjacent to the first vehicle; and determining the possibility of a collision between the first vehicle and the collision detection target using the collision detection areas of the first vehicle and the collision detection target; wherein setting the collision detection areas includes maintaining an attribute of the first collision detection area and changing an attribute of the second collision detection area in response to a change in the state of the first vehicle and the collision detection target.

In one embodiment, the memory 120 may store various types of data, commands, and/or information. The memory 120 may store programs (one or more instructions) for the processing and control of the processor 110. The programs stored in the memory 120 may be divided into a plurality of modules according to their function.

In various embodiments, steps of a method or algorithm described in conjunction with an embodiment of the present invention may be directly implemented by hardware, by a software module executed by hardware, or by a combination thereof. The software module may reside in random access memory (RAM), read-only memory (ROM), erasable programmable ROM (EPROM), electrically erasable programmable ROM (EEPROM), flash memory, a hard disk, a removable disk, CD-ROM, or a computer-readable storage medium well known to the art to which the present invention pertains. A method for avoiding the collision of an autonomous vehicle, which is performed by the computing apparatus 100, will be described below with reference to FIGS. 3 to 10.

Figure 3:
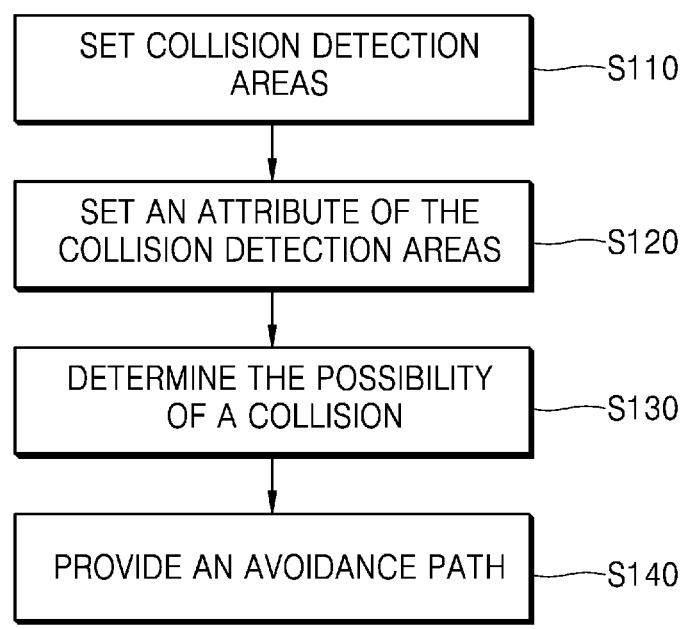
FIG. 3 is a flowchart of a method for avoiding the collision of an autonomous vehicle according to still another embodiment of the present invention.

FIG. 3 is a flowchart of a method for avoiding the collision of an autonomous vehicle according to still another embodiment of the present invention.

Referring to FIG. 3, at step S110, the computing apparatus 100 may set collision detection areas for a first vehicle and a collision detection target.

In various embodiments, the computing apparatus 100 may set collision detection areas by taking into account a state of the first vehicle and the collision detection target. For example, the computing apparatus 100 may set collision detection areas for the first vehicle and the collision detection target by taking into account the size, state (e.g., a moving state or a stationary state), moving speed or direction of the first vehicle and the collision detection target. The collision detection areas that are set by the computing apparatus 100 by taking into account the state of the first vehicle and the collision detection target will be described below with reference to FIGS. 4A and 4B.

Figure 4A:
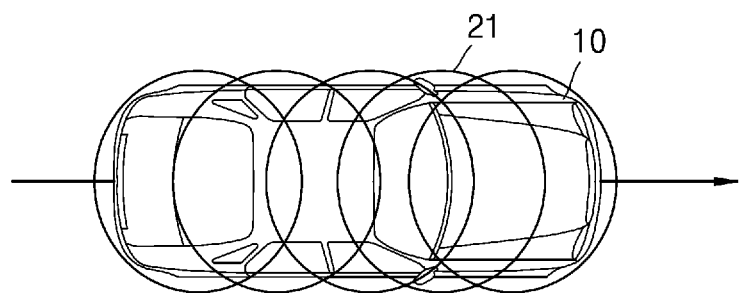
FIGS. 4A and 4B are views showing collision detection areas that are set by an apparatus for avoiding the collision of an autonomous vehicle in various embodiments.
Figure 4B:
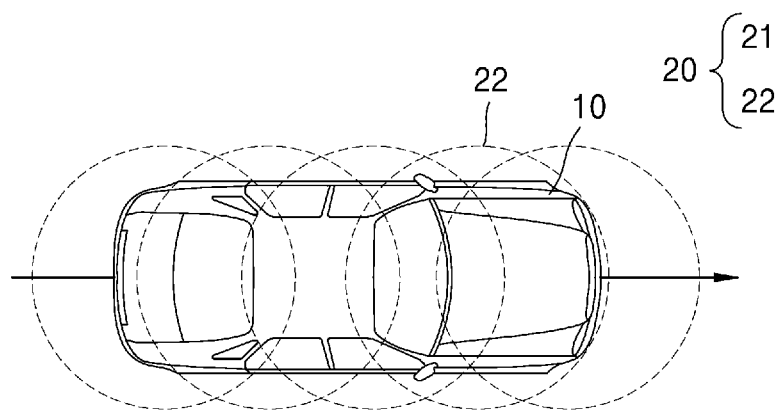

FIGS. 4A and 4B is a view showing collision detection areas that are set by the apparatus for avoiding the collision of an autonomous vehicle in various embodiments.

Referring to FIGS. 4A and 4B, the computing apparatus 100 may set collision detection areas including first and second collision detection areas based on a state of a first vehicle and a collision detection target.

In one embodiment, as shown in FIG. 4A, the computing apparatus 100 may set a first collision detection area 21 having a fixed predetermined size based on the size of a first vehicle 10. In this case, the predetermined size may refer to a size corresponding to the size of the first vehicle 10.

In one embodiment, as shown in FIG. 4B, the computing apparatus 100 may set a second collision detection area 22 having a predetermined size based on the size of the first vehicle 10. For example, the computing apparatus 100 may set the sizes of the first collision detection area 21 and the second collision detection area 22 to the same size based on the fact that the first vehicle 10 is in a stationary state. However, the present invention is not limited thereto, but the computing apparatus 100 sets the size of the second collision detection area 22 to a size larger than the size of the first collision detection area 21 based on the first vehicle 10 being in a stationary state.

In various embodiments, the computing apparatus 100 may set each of the first collision detection area 21 and the second collision detection area 22 in the form in which a plurality of circular detection areas overlaps each other by using Equations 1 and 2 below. However, the present invention is not limited thereto, but there may be applied various methods such as a method of directly receiving the first collision detection area 21 and the second collision detection area 22 through a UI that is provided to the user terminal 200.

First, the computing apparatus 100 may calculate the radii of a plurality of circular detection areas using Equation 1 below:

$$R_{shape} = w_{shape}\sqrt{l_r^2 + \left(\frac{w}{2}\right)^2} \quad (1)$$

where $R_{shape}$ is the radius of a circular detection area, $w_{shape}$ is the preset weight value of the detection area, $l_r$ is the distance from the center of the rear axle of the first vehicle 10 to the rear end of the first vehicle 10, and w is the lateral length of the first vehicle 10.

In various embodiments, the computing apparatus 100 may apply different $w_{shape}$ values to the first collision detection area 21 and the second collision detection area 22. For example, the computing apparatus 100 may set the second collision detection area 22 to a size larger than that of the first collision detection area 21 by setting the $w_{shape}$ value of the first collision detection area 21 to 0.7 and the $w_{shape}$ value of the second collision detection area 22 to 0.8. However, the present invention is not limited thereto.

Thereafter, the computing apparatus 100 may calculate the interval between the plurality of detection areas using Equation 2 below:

$$l_R = \frac{l_f - l_r}{n_{shape} - 1} \quad (2)$$

where $l_R$ is the interval between the center points of the plurality of detection areas, $l_r$ is the distance from the center of the rear axle of the first vehicle 10 to the rear end of the first vehicle 10, $l_f$ is the distance from the center of the rear axle of the first vehicle 10 to the front end of the first vehicle 10, and $n_{shape}$ is the number of the plurality of detection areas.

In various embodiments, the number $n_{shape}$ of the plurality of detection areas may be automatically generated based on the sizes of the first vehicle 10 and the collision detection target, or may be received from the user terminal 200. However, the present invention is not limited thereto.

In various embodiments, the computing apparatus 100 may set the diameter value $2R_{shape}$ of each of a plurality of detection areas included in the first collision detection area 21 and a plurality of detection areas included in the second collision detection area 22 to a value smaller than or equal to that of the width of a road.

In various embodiments, the computing apparatus 100 may set a plurality of second collision detection areas 22 having different sizes for the first vehicle 10. This will be described below with reference to FIG. 5.

Figure 5:
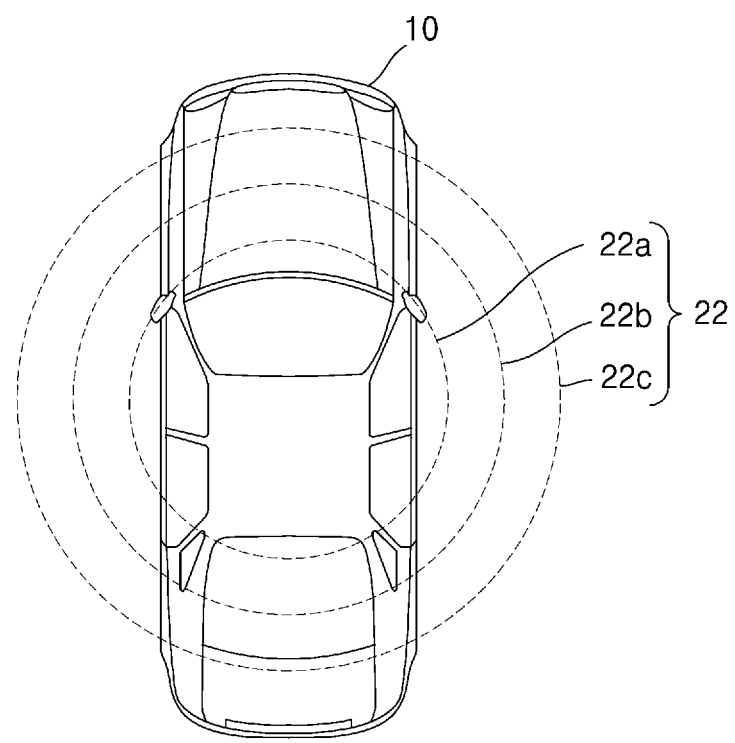
FIG. 5 is a view showing a state in which a plurality of second collision detection areas having different sizes is set for a first vehicle in various embodiments.

FIG. 5 is a view showing a state in which a plurality of second collision detection areas having different sizes is set for a first vehicle in various embodiments.

Referring to FIG. 5, in various embodiments, the computing apparatus 100 may set a plurality of second collision detection areas 22a, 22b and 22c having different sizes for the first vehicle 10, and may determine the possibilities of a collision for the plurality of second collision detection areas 22a, 22b and 22c based on different criteria.

For example, the computing apparatus 100 may set the second collision detection area 22a used to determine whether it overlaps the center line of a road or a guardrail, the second collision detection area 22b used to determine whether it overlaps the second vehicle 30 at a location adjacent to the first vehicle 10, and the second collision detection area 22c set to the widest range by taking into account safety. In this case, when a collision detection area set for a guardrail partially overlaps the second collision detection area 22c set to the widest range by taking into account safety but does not overlap the second collision detection area 22a used to determine whether it overlaps the center line of a road or a guardrail, the computing apparatus 100 may determine that the possibility of a collision of the first vehicle 10 with the guardrail is in a safe state. However, the present invention is not limited thereto.

In various embodiments, the computing apparatus 100 may represent the plurality of second collision detection areas 22a, 22b and 22c as one parameter using a preset probability model (e.g., a Gaussian model) so that a different level is measured based on the distances to the centers of the plurality of second collision detection areas 22a, 22b and 22c.

Referring back to FIG. 3, at step S120, when a state of the first vehicle 10 and the collision detection target is changed, the computing apparatus 100 may change an attribute of the collision detection areas set for the first vehicle 10 and the collision detection target. For example, the computing apparatus 100 may change the size or number of the collision detection areas for the first vehicle 10 and the collision detection target in response to a change in the speed of the first vehicle 10 and the collision detection target. This will be described below with reference to FIGS. 6 to 8.

Figure 6A:
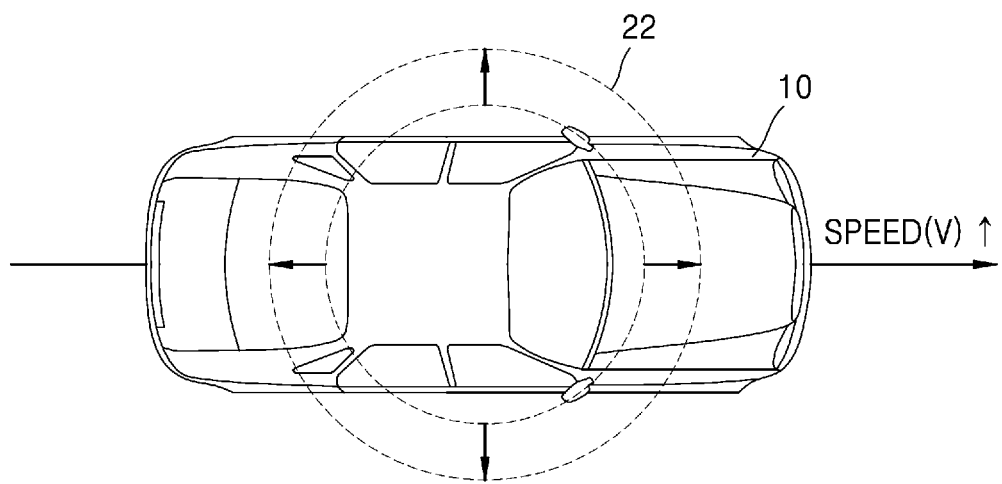
FIGS. 6A and 6B are views showing a configuration of changing the size of a collision detection area in response to a change in the speed of an autonomous vehicle in various embodiments.
Figure 6B:
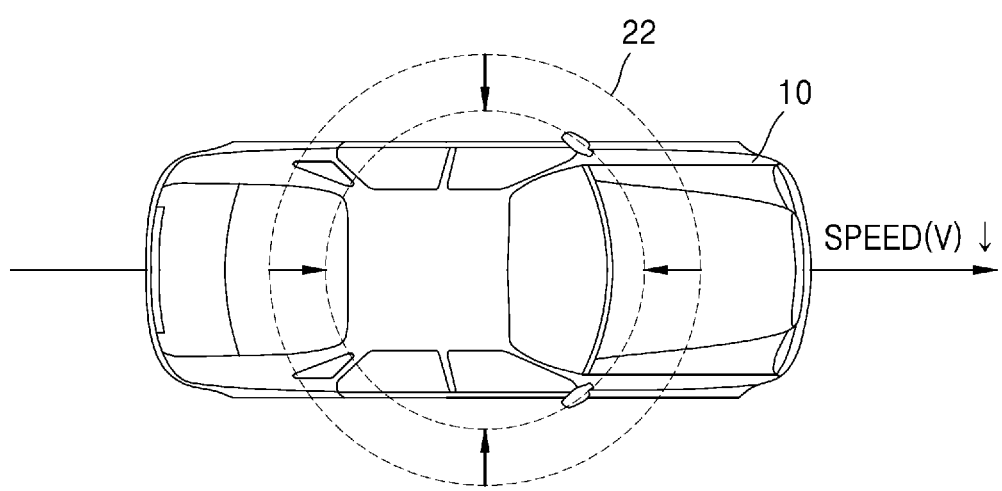

FIGS. 6A and 6B are views showing a configuration of changing the size of a collision detection area in response to a change in the speed of an autonomous vehicle in various embodiments.

Referring to FIGS. 6A and 6B, in one embodiment, the computing apparatus 100 may change the size of the second collision detection area 22 in response to a change in the speed of the first vehicle 10 and the collision detection target.

In various embodiments, the computing apparatus 100 may adjust the size of the second collision detection area 22 by changing the radius values of a plurality of detection areas included in the second collision detection area 22 of the first vehicle 10 in response to a change in the speed of the first vehicle 10.

First, referring to FIG. 6A, the computing apparatus 100 may increase the size of the second collision detection area 22 in response to an increase in the speed of the first vehicle 10. For example, the computing apparatus 100 may increase the $R_{shape}$ or $w_{shape}$ value of a plurality of detection areas included in the second collision detection area 22 by a size corresponding to an increase in the speed of the first vehicle 10 using a preset ratio. However, the present invention is not limited thereto.

Furthermore, referring to FIG. 6B, the computing apparatus 100 may decrease the size of the second collision detection area 22 in response to a decrease in the speed of the first vehicle 10. For example, the computing apparatus 100 may decrease the $R_{shape}$ or $w_{shape}$ value of the plurality of detection areas included in the second collision detection area 22 by a size corresponding to a decrease in the speed of the first vehicle 10 using a preset ratio.

In various embodiments, the computing apparatus 100 may decrease the size of the second collision detection area 22 in response to a decrease in the speed of the first vehicle 10, in which case the size of the second collision detection area 22 may be set to a size equal to or larger than that of the first collision detection area 21. However, the present invention is not limited thereto.

Figure 7A:
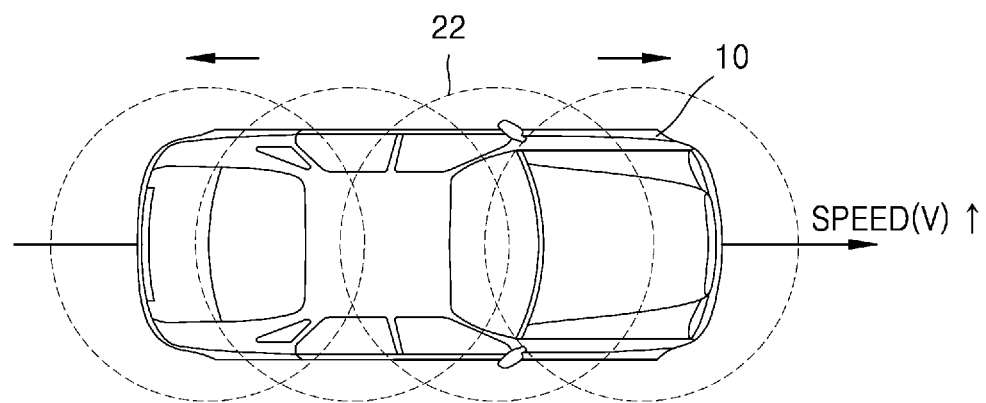
FIGS. 7A and 7B are views showing a configuration of changing the interval between a plurality of detection areas included in a collision detection area in response to a change in the speed of an autonomous vehicle in various embodiments.
Figure 7B:
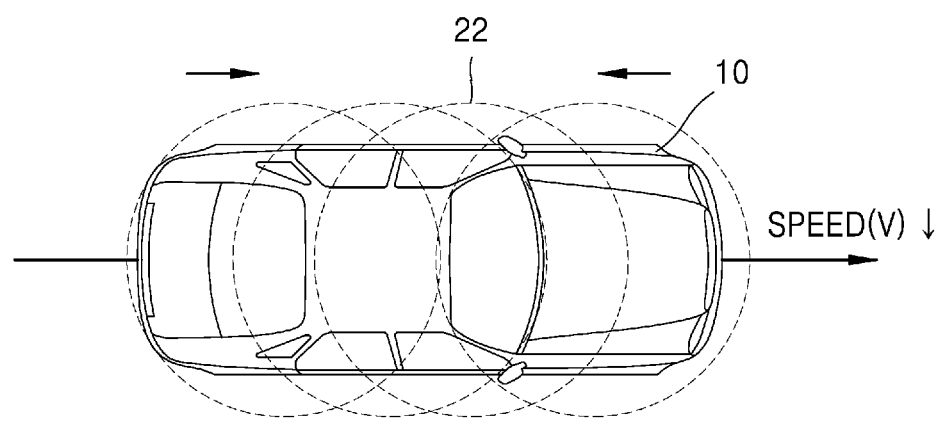

FIGS. 7A and 7B are views showing a configuration of changing the interval between a plurality of detection areas included in a collision detection area in response to a change in the speed of an autonomous vehicle in various embodiments.

Referring to FIGS. 7A and 7B, in one embodiment, the computing apparatus 100 may change the interval between the plurality of detection areas included in the second collision detection area 22 in response to a change in the speed of the first vehicle 10 and the collision detection target.

First, referring to FIG. 7A, the computing apparatus 100 may increase the interval between the plurality of detection areas included in the second collision detection area 22 in response to an increase in the speed of the first vehicle 10. For example, the computing apparatus 100 may increase the 1R value of a plurality of detection areas included in the second collision detection area 22 by a size corresponding to an increase in the speed of the first vehicle 10 using a preset ratio. However, the present invention is not limited thereto.

Furthermore, referring to FIG. 7B, the computing apparatus 100 may decrease the interval between the plurality of detection areas included in the second collision detection area 22 in response to a decrease in the speed of the first vehicle 10. For example, the computing apparatus 100 may decrease the 1R value of the plurality of detection areas included in the second collision detection area 22 by a size corresponding to a decrease in the speed of the first vehicle 10 using a preset ratio.

In various embodiments, the computing apparatus 100 may decrease the interval between the plurality of detection areas included in the second collision detection area 22 in response to a decrease in the speed of the first vehicle 10, in which case the size of the second collision detection area 22 may be set to a size equal to or larger than that of the first collision detection area 21. However, the present invention is not limited thereto.

Figure 8:
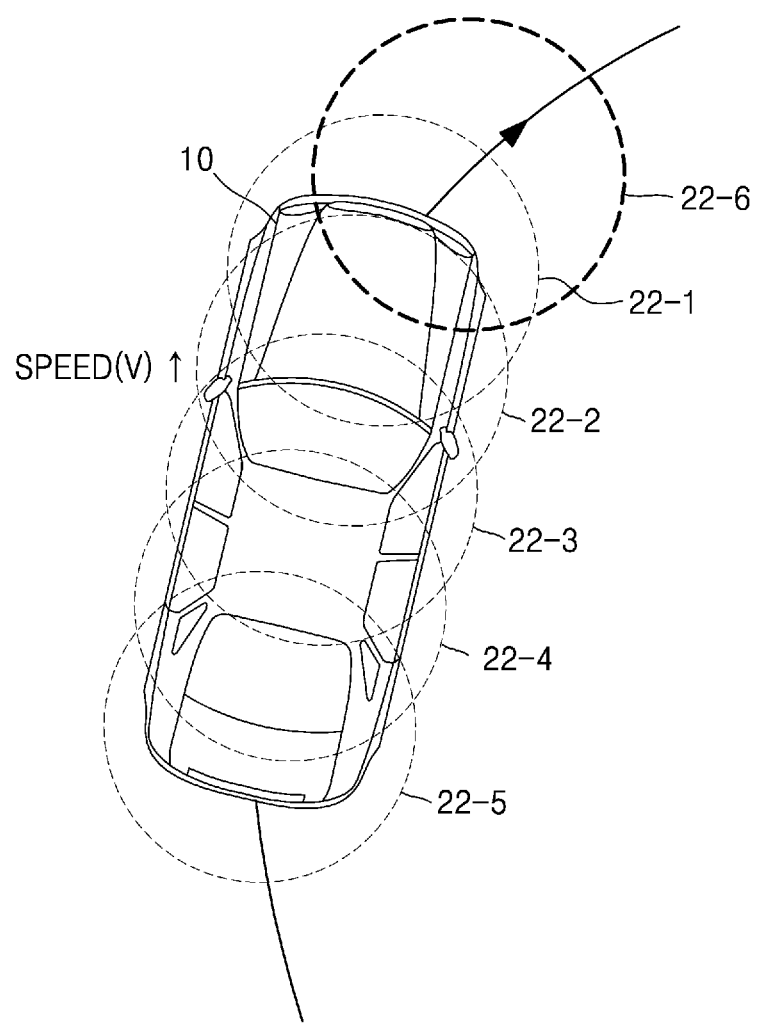
FIG. 8 is a view showing a configuration of adding a detection area in response to a change in the speed of an autonomous vehicle in various embodiments.

FIG. 8 is a view showing a configuration of adding a detection area in response to a change in the speed of an autonomous vehicle in various embodiments.

Referring to FIG. 8, the computing apparatus 100 may change the number of a plurality of detection areas included in the second collision detection area 22 in response to a change in the speed of the first vehicle 10 and the collision detection target.

In various embodiments, the computing apparatus 100 may increase the number of at least one detection area included in the second collision detection area 22 in response to an increase in the speed of the first vehicle 10. For example, the computing apparatus 100 may set the second collision detection area 22 including a first detection area 22-1, a second detection area 22-2, a third detection area 22-3, a fourth detection area 22-4, and a fifth detection area 22-5 based on the state in which the first vehicle 10 is stationary.

Thereafter, when speed increases in the state in which the first vehicle 10 is moving forward, the computing apparatus 100 may add a sixth detection area 22-6, i.e., a new detection area, in front of the second collision detection area 22 of the first vehicle 10 (e.g., in front of the first detection area 22-1). Furthermore, when speed increases in the state in which the first vehicle 10 is moving backward, the computing apparatus 100 may add a sixth detection area 22-6, i.e., a new detection area, in back of the second collision detection area 22 of the first vehicle 10 (e.g., in back of the fifth detection area 22-5). However, the present invention is not limited thereto.

In various embodiments, the computing apparatus 100 may add the sixth detection area 22-6, i.e., a new detection area, in front of the second collision detection area 22 in response to an increase in the speed of the first vehicle 10, in which case the sixth detection area 22-6 may be disposed on a preset path when there is the preset path for the first vehicle 10. For example, when the first vehicle 10 has a preset path and the preset path is a right turn path, the computing apparatus 100 may dispose a sixth detection area 22-6 at a location biased to the right in front of the first vehicle 10.

In various embodiments, the computing apparatus 100 may decrease the number of at least one detection area included in the second collision detection area 22 in response to a decrease in the speed of the first vehicle 10. For example, the computing apparatus 100 may decrease the number of at least one detection area included in the second collision detection area 22 in response to a decrease in the speed of the vehicle 10.

In various embodiments, the computing apparatus 100 may decreases the number of at least one detection area included in the second collision detection area 22 in response to a decrease in the speed of the first vehicle 10, in which case the computing apparatus 100 may delete a detection area newly added in response to an increase in the speed of the first vehicle 10 (e.g., the sixth detection area 22-6). However, the present invention is not limited thereto.

Referring back to FIG. 3, at step S130, the computing apparatus 100 may determine the possibility of a collision between the first vehicle 10 and the collision detection target. For example, the computing apparatus 100 may determine the possibility of a collision based on the distance between the collision detection areas set for the first vehicle 10 and the collision detection target or a form in which the collision detection areas overlap each other. This will be described below with reference to FIGS. 9 and 10.

Figure 9:
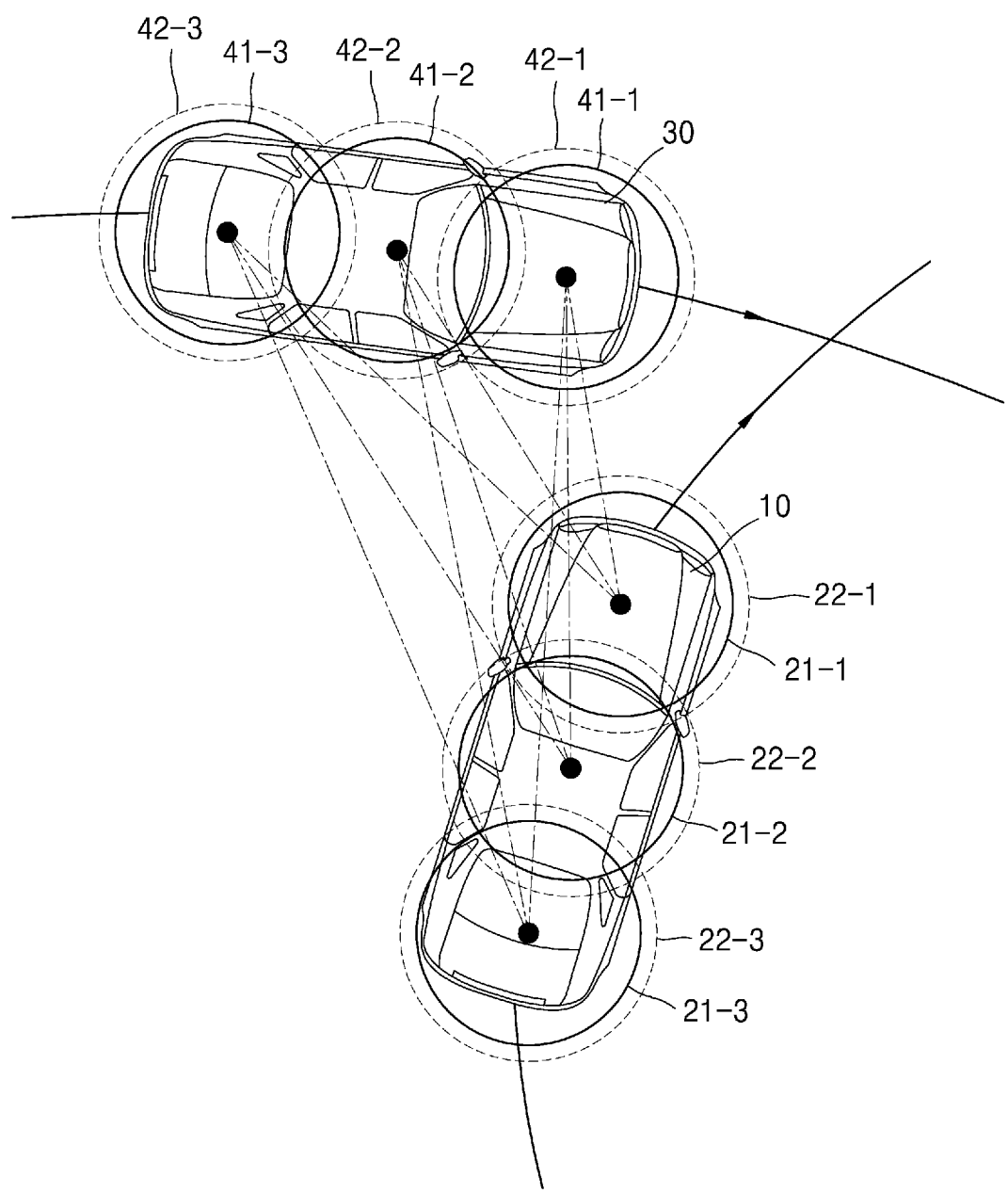
FIG. 9 is a view showing a configuration of determining the possibility of a collision between an autonomous vehicle and a collision detection target in various embodiments.

FIG. 9 is a view showing a configuration of determining the possibility of a collision between an autonomous vehicle and a collision detection target in various embodiments.

Referring to FIG. 9, in various embodiments, the computing apparatus 100 may determine the possibility of a collision by comparing the distances between the center points of the a plurality of detection areas 20-1, 20-2 and 20-3 included in the collision detection area 20 of the first vehicle 10 and the center points of a plurality of detection areas 40-1, 40-2 and 40-3 included in the collision detection area 40 of the collision detection target 30.

First, when the collision detection target is the second vehicle 30, the computing apparatus 100 may calculate the distances from the center point of the first detection area 20-1 of the first vehicle 10 to the center points of the first detection area 40-1, second detection area 40-2 and third detection area 40-3 of the second vehicle 30. Furthermore, the computing apparatus 100 may calculate the distances from the center point of the second detection area 20-2 of the first vehicle 10 to the center points of the first detection area 40-1, second detection area 40-2 and third detection area 40-3 of the second vehicle 30. Furthermore, the computing apparatus 100 may calculate the distances from the center point of the third detection area 20-3 of the first vehicle 10 to the center points of the first detection area 40-1, second detection area 40-2 and third detection area 40-3 of the second vehicle 30.

Thereafter, the computing apparatus 100 may determine the possibility of a collision between the first vehicle 10 and the second vehicle 30 by comparing the nine distance values, calculated by the above-described method, and a reference value.

In this case, the reference value may refer to a value obtained by summing the radii of the two detection areas (e.g., the specific detection area of the first vehicle 10 and the specific detection area of the second vehicle 30), which are distance value calculation targets.

For example, where there is a case where one of the nine distance values calculated by the above-described method is smaller than the sum of the radius of a corresponding one of the first detection areas 21-1, 21-2 and 21-3 of the first vehicle 10 and the radius of a corresponding one of the first detection areas 41-1, 41-2 and 41-3 included in the second vehicle 30, the computing apparatus 100 may determine that the first vehicle 10 and the second vehicle 30 are in a collision state.

Furthermore, when the first vehicle 10 and the second vehicle 30 are not in a collision state and there is a case where one of the nine distance values calculated by the above-described method is smaller than the sum of the radius of a corresponding one of the second detection areas 22-1, 22-2 and 22-3 of the first vehicle 10 and the radius of a corresponding one of the first detection areas 41-1, 41-2 and 41-3 included in the second vehicle 30 or smaller than the sum of the radius of a corresponding one of the first detection areas 21-1, 21-2 and 21-3 of the first vehicle 10 and the radius of a corresponding one of the first detection areas 41-1, 41-2 and 41-3 included in the second vehicle 30, the computing apparatus 100 may determine that the first vehicle 10 and the second vehicle 30 are in a collision risk state.

Furthermore, when the first vehicle 10 and the second vehicle 30 are neither in a collision state nor in a collision risk state and there is a case where one of the nine distance values calculated by the above-described method is smaller than the sum of the radius of a corresponding one of the second detection areas 22-1, 22-2 and 22-3 of the first vehicle 10 and the radius of a corresponding one of the second detection areas 42-1, 42-2 and 42-3 included in the second vehicle 30, the computing apparatus 100 may determine that the first vehicle 10 and the second vehicle 30 are in a collision caution state.

Furthermore, when each of the nine distance values calculated by the above-described method is larger than the sum of the radius of a corresponding one of the second detection areas 22-1, 22-2 and 22-3 of the first vehicle 10 and the radius of a corresponding one of the second detection areas 42-1, 42-2 and 42-3 included in the second vehicle 30, the computing apparatus 100 may determine that the first vehicle 10 and the second vehicle 30 are in a safe state. However, the present invention is not limited thereto.

FIGS. 10A to 10D are views showing a configuration in which an apparatus for avoiding the collision of an autonomous vehicle determines a collision state based on a size in which the collision detection areas of an autonomous vehicle and a collision detection target overlap each other in various embodiments.

Referring to FIGS. 10A to 10D, in various embodiments, the computing apparatus 100 may determine the possibility of a collision between the first vehicle 10 and the collision detection target 30 based on the area in which the first and second collision detection areas 21 and 22 of the first vehicle 10 and the first and second collision detection areas 41 and 42 of the collision detection target 30.

Figure 10A:
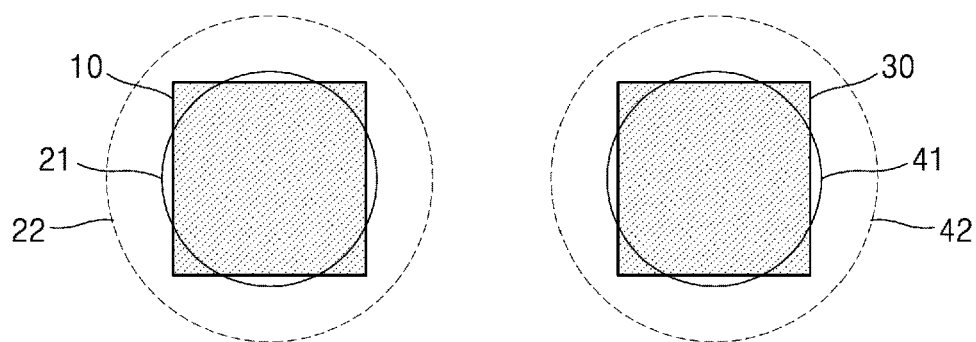
FIGS. 10A to 10D are views showing a configuration in which an apparatus for avoiding the collision of an autonomous vehicle determines a collision state based on a size in which the collision detection areas of an autonomous vehicle and a collision detection target overlap each other in various embodiments.

For example, as shown in FIG. 10A, when the first and second collision detection areas 21 and 22 of the first vehicle 10 do not overlap the first and second collision detection areas 41 and 42 of the collision detection target 30, the computing apparatus 100 may determine that the first vehicle 10 and the collision detection target 30 are in a safe state.

Figure 10B:
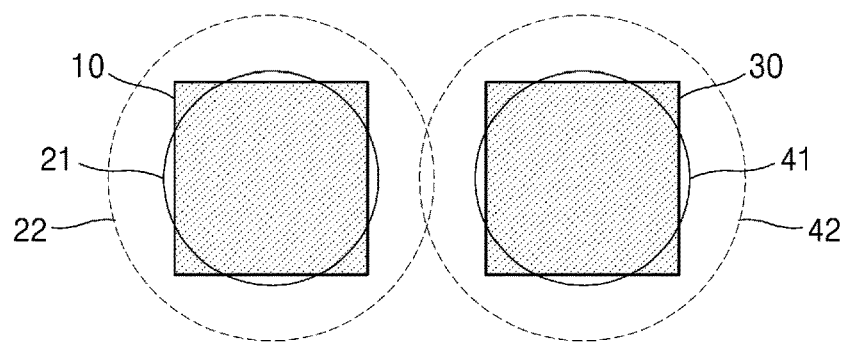

Furthermore, as shown in FIG. 10B, when the second collision detection area 22 of the first vehicle 10 overlaps the second collision detection area 42 of the collision detection target 30, the computing apparatus 100 may determine that the first vehicle 10 and the collision detection target 30 are in a collision caution state.

Figure 10C:
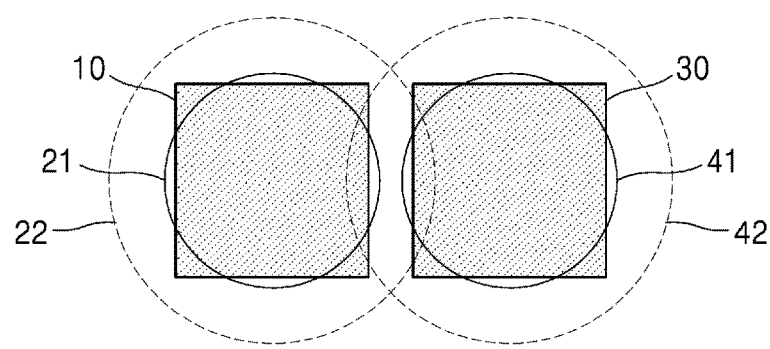

Furthermore, as shown in FIG. 10C, when the second collision detection area 22 of the first vehicle 10 overlaps the first collision detection area 41 of the collision detection target 30 or the first collision detection area 21 of the first vehicle 10 overlaps the second collision detection area 42 of the collision detection target 30, the computing apparatus 100 may determine that the first vehicle 10 and the collision detection target 30 are in a collision risk state.

Figure 10D:
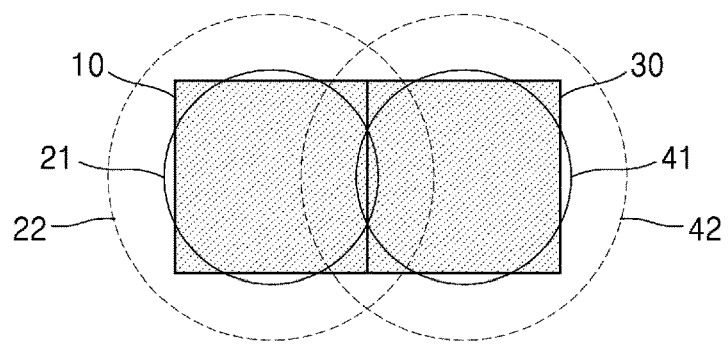

Furthermore, as shown in FIG. 10D, when the first collision detection area 21 of the first vehicle 10 overlaps the first collision detection area 41 of the collision detection target 30, the computing apparatus 100 may determine that the first vehicle 10 and the collision detection target 30 are in a collision state. However, the present invention is not limited thereto.

In various embodiments, when it is determined that the first vehicle 10 and the collision detection target 30 are in a safe state, the computing apparatus 100 may exclude the collision detection target 30 from collision possibility determination targets. By doing this, the computational load required to determine the possibilities of a collision between the first vehicle 10 and a plurality of adjacent collision detection targets 30 may be reduced.

In various embodiments, when the collision detection target 30 is the second vehicle 30 traveling at a location adjacent to the first vehicle 10, the computing apparatus 100 may determine the possibility of a collision between the first vehicle 10 and the second vehicle 30 by taking into account a preset travel path as well as the collision detection areas of the first vehicle 10 and the second vehicle 30. This will be described below with reference to FIG. 11.

Figure 11:
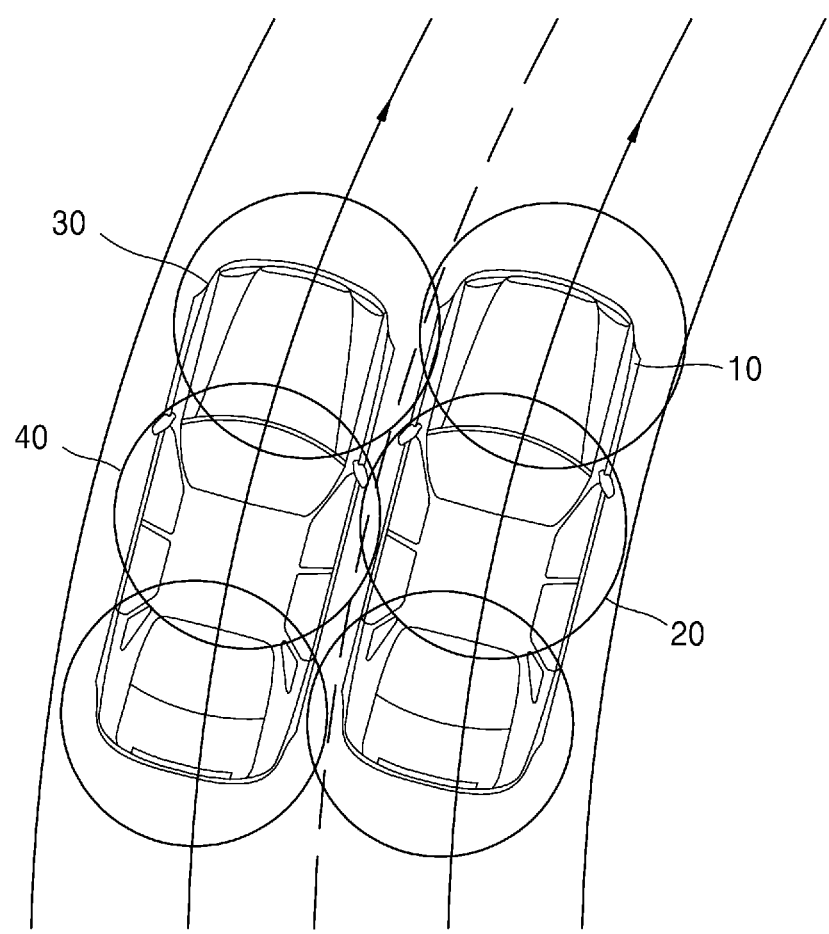
FIG. 11 is a view showing a configuration of, when a collision detection target is a vehicle, determining the possibility of a collision based on the collision detection areas and paths of vehicles in various embodiments.

FIG. 11 is a view showing a configuration of, when a collision detection target is a vehicle, determining the possibility of a collision based on the collision detection areas and paths of vehicles in various embodiments.

In one embodiment, when a collision detection target 30 is a second vehicle 30 traveling at a location adjacent to a first vehicle 10 and the first vehicle 10 has a preset travel path, the possibility of a collision between the first vehicle 10 and the second vehicle 30 may be determined by taking into account whether the collision detection areas and the travel paths of the first vehicle 10 and the second vehicle 30 overlap each other.

For example, when travel paths preset for the first vehicle 10 and the second vehicle 30, respectively, overlap each other and the second collision detection area of the collision detection areas 20 of the first vehicle 10 and the second collision detection area of the collision detection areas 40 of the second vehicle 30 at least partially overlap each other, the computing apparatus 100 may determine that the first vehicle 10 and the second vehicle 30 are in at least one of a collision risk state and a collision caution state.

In contrast, as shown in FIG. 11, in the case where a travel path preset for the first vehicle 10 is the same as a travel path preset for the second vehicle 30, when the first vehicle 10 and the second vehicle 30 move along the travel paths, the computing apparatus 100 may determine that there is no possibility of a collision, and may thus determine that the first vehicle 10 and the second vehicle 30 are in a safe state even when the second collision detection area of the collision detection areas 20 of the vehicle 10 partially overlaps the second collision detection area of the collision detection area 40 of the second vehicle 30. In this case, the computing apparatus 100 may determine the travel path of the second vehicle 30 using the angles between lines connecting the centers of a plurality of detection areas included in the first vehicle 10 and the centers of a plurality of detection areas included in the second vehicle 30 and the preset travel path of the first vehicle 10. However, the present invention is not limited thereto.

In various embodiments, even in the case where a travel path preset for the first vehicle 10 is the same as a travel path preset for the second vehicle 30, when any one of the first and second vehicles 10 and 30 deviates from the preset travel path or may deviate from the preset travel path (e.g., when a change to a traffic lane other than a traffic lane set for the preset travel path is made or a trigger intended to change a traffic lane is generated (e.g., when a turn signal is turned on or a vehicle moves to the left or right from the center of a traffic lane)), the computing apparatus 100 may determine that a state in question is at least one of a collision risk state and a collision caution state based on a form in which the collision detection area 20 of the first vehicle 10 overlaps the collision detection area 40 of the second vehicle 30 regardless of the preset travel path.

In various embodiments, the computing apparatus 100 may predict a change in the state of the first vehicle 10 and the collision detection target (e.g., a change in speed, a change in path, movement, and/or the like) at a second time point, i.e., a future time point, based on a first time point indicative of a current time point. Thereafter, the computing apparatus 100 may predictively determine the possibility of a collision between the first vehicle 10 and the collision detection target at the second time point based on the predicted changes in the state of the first vehicle 10 and the collision detection target. However, the present invention is not limited thereto.

Referring back to FIG. 3, at step S140, the computing apparatus 100 may provide an avoidance path to the first vehicle 10 when the first vehicle 10 and the collision detection target are in at least one of a collision risk state and a collision caution state.

In various embodiments, the computing apparatus 100 may calculate a score for each of a plurality of travel paths including a travel path preset for the first vehicle 10 by scoring the possibility of a collision with the collision detection target when the first vehicle 10 travels along each of the plurality of travel paths. In this case, when the first vehicle 10 and the collision detection target are in at least one of a collision risk state and a collision caution state, the computing apparatus 100 may set a travel path having the highest calculated score among the plurality of travel paths as an avoidance path for the first vehicle. In this case, the travel path may refer to information including the starting point of a vehicle, a destination, a moving speed, a travel traffic lane, and a location where traffic lanes are changed.

For example, the computing apparatus 100 may calculate scores for a plurality of travel paths including a first travel path, i.e., a travel path preset for the first vehicle 10, a second travel path and a third travel path by scoring the possibility of a collision with the collision detection target when the first vehicle 10 travels along the first travel path, the possibility of a collision with the collision detection target when the first vehicle 10 travels along the second travel path, and the possibility of a collision with the collision detection target when the first vehicle 10 travels along the third travel path (e.g., a safe state: 10 points, a collision caution state: 9 points, and a collision risk state: 8 points).

Thereafter, when it is determined that the possibility of a collision of the first vehicle 10, traveling along the first travel path, with the collision detection target corresponds to a collision risk state or a collision caution state, a travel path (e.g., the second travel path) having the highest calculated score among the first travel path, the second travel path and the third travel path may be set as an avoidance path for the first vehicle, and then the first vehicle 10 may be allowed to change its travel path to the second travel path, i.e., an avoidance path set for the first vehicle 10, and travel along the second travel path. However, the present invention is not limited thereto.

In various embodiments, at step S140, when the first vehicle 10 and the collision detection target are in at least one of a collision risk state and a collision caution state, the computing apparatus 100 may decrease the moving speed of the first vehicle 10.

In various embodiments, when the first vehicle 10 and the collision detection target are in at least one of a collision risk state and a collision caution state, the computing apparatus 100 may determine the possibility of a collision between the first vehicle 10 and the collision detection target when each of the method of decreasing the speed of the first vehicle 10 and the method of changing the travel path of the first vehicle 10 is performed, may select one of the method of decreasing the speed of the first vehicle 10 and the method of changing the travel path of the first vehicle 10 based on the results of the determination, and may then generate an avoidance path.

The above-described method for avoiding the collision of an autonomous vehicle has been described with reference to the flowchart shown in the drawing. For brevity of description, the method for avoiding the collision of an autonomous vehicle has been shown and described as a series of blocks. However, the present invention is not limited to the sequence of the blocks, and some blocks may be performed in a sequence different from that shown and described therein or may be performed simultaneously. Furthermore, new blocks not described or shown in the specification or drawings may be added, or some blocks may be deleted or changed.

According to various embodiments of the present invention, the possibility of a collision is determined by taking into account whether collision detection areas set for a vehicle and a collision detection target overlap each other, in which case an attribute of the collision detection areas is changed according to the state of the vehicle and the collision detection target, thereby providing the advantage of enabling the possibility of a collision to be more accurately determined.

The effects of the present invention are not limited to the above-described effects, and other effects that have not been described above will be clearly understood by those skilled in the art from the foregoing description.

While the embodiments of the present invention have been described above with reference to the accompanying drawings, it will be understood that those having ordinary skill in the art to which the present invention pertains may implement the present invention in other specific forms without changing its technical spirit or essential features. Therefore, it should be understood that the above-described embodiments are illustrative but not restrictive in all respects.

What is claimed is:

1. A method for avoiding a collision of an autonomous vehicle, the method being performed by a computing apparatus, the method comprising:

setting a collision detection area of a first vehicle and a collision detection area of at least one collision detection target based on a state of the first vehicle and the collision detection target at a location adjacent to the first vehicle; wherein each of the collision detection area of the first vehicle and the collision detection area of the collision detection target includes a first collision detection area and a second collision detection area, and determining a possibility of a collision between the first vehicle and the collision detection target using the collision detection area of the first vehicle and the collision detection area of the collision detection target;

wherein setting the collision detection areas comprises maintaining an attribute of the first collision detection area and changing an attribute of the second collision detection area in response to a change in the state of the first vehicle and the collision detection target, wherein the collision detection area of the first vehicle includes a plurality of second collision detection areas having different sizes;

wherein the plurality of second collision detection areas include a collision detection area for determining a possibility of a collision with a guardrail, a collision detection area for determining a possibility of a collision with the second vehicle adjacent to the first vehicle, and a collision detection area having a largest size among the plurality of second collision detection areas, and wherein different criteria are applied to the plurality of second collision detection areas to determine the possibility of the collision between the first vehicle and the collision detection target.

2. The method of claim 1, wherein changing the attribute of the second collision detection area comprises:

increasing a size of the second collision detection area of the first vehicle in response to an increase in a speed of the first vehicle and the collision detection target; and decreasing a size of the second collision detection area of the first vehicle in response to a decrease in a speed of the first vehicle and the collision detection target such that the second collision detection area of the first vehicle is equal to or larger than the first collision detection area of the first vehicle.

3. The method of claim 1, wherein:

each of the first collision detection area and the second collision detection area comprises at least one detection area having a predetermined size and shaped in a circular form; and the changing of the attribute of the second collision detection area comprises:

increasing an interval of the at least one detection area included in the second collision detection area in response to an increase in a speed of the first vehicle and the collision detection target; and decreasing the interval of the at least one detection area included in the second collision detection area in response to a decrease in the speed of the first vehicle and the collision detection target.

4. The method of claim 1, wherein:

each of the first collision detection area and the second collision detection area comprises at least one detection area having a predetermined size and formed in a circular shape; and the changing of the attribute of the second collision detection area comprises:

increasing a number of the at least one detection area included in the second collision detection area in response to an increase in a speed of the first vehicle and the collision detection target; and decreasing a number of the at least one detection area included in the second collision detection area in response to a decrease in the speed of the first vehicle and the collision detection target.

5. The method of claim 4, wherein the increasing of the number of the at least one detection area comprises disposing the increased at least one detection area in front of the first vehicle and the collision detection target, and the increased at least one detection area is disposed on a preset path when there is the path preset for each of the first vehicle and the collision detection target.

6. The method of claim 1, wherein:

the collision detection target is the second vehicle adjacent to the first vehicle;

the setting of the collision detection area comprises changing an attribute of the second collision detection area of the first vehicle and the collision detection area of the second vehicle based on a path preset for the first vehicle and a speed of the first vehicle and a path preset for the second vehicle and a speed of the second vehicle; and the determining of the possibility of the collision between the first vehicle and the collision detection target comprises determining the possibility of a-the collision with the second vehicle based on whether the collision detection area of the first vehicle and the collision detection area of the second vehicle overlap each other and whether a-the path preset for the first vehicle and the path preset for the second vehicle overlap each other.

7. The method of claim 1, wherein the determining of the possibility of the collision between the first vehicle and the collision detection target comprises:

determining that the first vehicle and the collision detection target are in a collision state when the first collision detection area of the first vehicle and the first collision detection area of the collision detection target at least partially overlap each other;

determining that the first vehicle and the collision detection target are in a collision risk state when the first collision detection area of the first vehicle and the first collision detection area of the collision detection target do not overlap each other and the first collision detection area of the first vehicle and the second collision detection area of the collision detection target at least partially overlap each other;

determining that the first vehicle and the collision detection target are in a collision caution state when the first collision detection area of the first vehicle and the second collision detection area of the collision detection target do not overlap each other and the second collision detection area of the first vehicle and the second collision detection area of the collision detection target at least partially overlap each other; and determining that the first vehicle and the collision detection target are in a safe state when the second collision detection area of the first vehicle and the second collision detection area of the collision detection target do not overlap each other.

8. The method of claim 7, wherein:

the collision detection target comprises a plurality of objects including a first object, and determining of the possibility of the collision between the first vehicle and the collision detection target comprises excluding the first object from the collision detection target to reduce an amount of computation when it is determined that the first vehicle and the collision detection target are in the safe state.

9. The method of claim 7, wherein:

determining the possibility of the collision between the first vehicle and the collision detection target comprises calculating a score for each of a plurality of travel paths including a travel path preset for the first vehicle by scoring the possibility of the collision with the collision detection target when the first vehicle travels along each of the plurality of travel paths; and the method further comprises setting a travel path having the a highest calculated score among the plurality of travel paths as an avoidance path for the first vehicle when the first vehicle and the collision detection target are in at least one of the collision risk state and the collision caution state.

10. The method of claim 1, wherein determining the possibility of the collision between the first vehicle and the collision detection target comprises:

predicting a change in a state of the first vehicle and the collision detection target; and determining the possibility of the collision between the first vehicle and the collision detection target based on the predicted change in the state of the first vehicle and the collision detection target.

11. An apparatus comprising:

memory configured to store one or more instructions; and a processor configured to execute the one or more instructions stored in the memory;

wherein the processor performs the method of claim 1 by executing the one or more instructions.

12. A non-transitory computer-readable storage medium having stored thereon a computer program that, when executed by a processor, causes the processor to perform the method of claim 1.

\* \* \* \* \*